(12) United States Patent
Depke et al.

(10) Patent No.: US 8,983,642 B2
(45) Date of Patent: *Mar. 17, 2015

(54) SYSTEMS AND METHODS FOR THE IDENTIFICATION AND/OR DISTRIBUTION OF MUSIC AND OTHER FORMS OF USEFUL INFORMATION

(71) Applicants: Bernadette Depke, Orland Park, IL (US); Robert J. Depke, Orland Park, IL (US); Brian Houlihan, Naperville, IL (US)

(72) Inventors: Bernadette Depke, Orland Park, IL (US); Robert J. Depke, Orland Park, IL (US); Brian Houlihan, Naperville, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/829,341

(22) Filed: Mar. 14, 2013

(65) Prior Publication Data

US 2013/0205222 A1    Aug. 8, 2013

Related U.S. Application Data

(62) Division of application No. 10/806,201, filed on Mar. 22, 2004.

(51) Int. Cl.
| | |
|---|---|
| *G06F 17/00* | (2006.01) |
| *G06F 17/30* | (2006.01) |
| *G06F 12/02* | (2006.01) |
| *H04L 29/08* | (2006.01) |

(52) U.S. Cl.
CPC ...... *G06F 17/3074* (2013.01); *G06F 17/30017* (2013.01); *G06F 17/30749* (2013.01); *G06F 17/30758* (2013.01); *G06F 17/30772* (2013.01); *G10H 2240/125* (2013.01); *G10H 2240/305* (2013.01); *G06F 12/0246* (2013.01); *H04L 67/06* (2013.01)
USPC ........................................................... 700/94

(58) Field of Classification Search
USPC ............................................ 455/3.06; 700/94
See application file for complete search history.

(56) References Cited

U.S. PATENT DOCUMENTS

| | | | |
|---|---|---|---|
| 4,581,656 | A | 4/1986 | Wada |
| 4,823,376 | A | 4/1989 | Takahashi |
| 5,257,404 | A | 10/1993 | Goreham et al. |
| 5,699,177 | A | 12/1997 | Yamamoto |
| 5,710,922 | A * | 1/1998 | Alley et al. ......................... 1/1 |
| 5,960,411 | A | 9/1999 | Hartman et al. |
| 6,072,599 | A | 6/2000 | Oba et al. |
| 6,266,162 | B1 | 7/2001 | Okamura et al. |
| 6,526,036 | B1 | 2/2003 | Uchida et al. |
| 6,912,200 | B2 | 6/2005 | Halme |
| 7,028,082 | B1 * | 4/2006 | Rosenberg et al. ........... 709/223 |
| 7,415,430 | B2 | 8/2008 | Christensen et al. |

(Continued)

*Primary Examiner* — Andrew C Flanders
(74) *Attorney, Agent, or Firm* — Robert J. Depke; The Chicago Technology Law Group, LLC (57) ABSTRACT

The present invention relates generally to the field of telecommunications systems and methods. More specifically, the present invention is directed to systems and methods for identifying and/or distributing music and other types of useful information for users in a very simple and convenient manner. A variety of systems and methods are disclosed which provide users with quick and convenient access to various forms of information, such as, for example, audio information including music and news items as well as coupons and other information. The systems and methods allow users to store data representative of a time of transmission and preferably a source of transmission so that data of interest may be identified for ordering an/or downloading.

11 Claims, 4 Drawing Sheets

(56) References Cited

U.S. PATENT DOCUMENTS

| | | |
|---|---|---|
| 7,430,408 B2 | 9/2008 | Lee et al. |
| 7,489,786 B2 | 2/2009 | Marlowe |
| 2002/0027907 A1 | 3/2002 | Tateoka |
| 2002/0062252 A1 | 5/2002 | Van Zoest et al. |
| 2003/0046238 A1 | 3/2003 | Nonaka et al. |
| 2003/0186645 A1 | 10/2003 | Mori |
| 2003/0215102 A1 | 11/2003 | Marlowe |
| 2005/0049971 A1 | 3/2005 | Bettinger |
| 2005/0206370 A1 | 9/2005 | Pan et al. |

\* cited by examiner

| | WXXX | |
|---|---|---|
| 10:00 | NEWS ITEM 1 | (WEB PAGE) (FILE) (ADDLINES) |
| 10:01 | NEWS ITEM 2 | |
| 10:03 | COMMERCIAL 1 | |
| 10:07 | SONG 1 BY ARTIST A | |
| 10:20 | SONG 2 BY ARTIST B | |
| 10:22 | COMMERCIAL 3 | |

SYSTEMS AND METHODS FOR THE IDENTIFICATION AND/OR DISTRIBUTION OF MUSIC AND OTHER FORMS OF USEFUL INFORMATION

The subject matter of application Ser. No. 10/806,201, is incorporated herein by reference. The present application is a Divisional of U.S. Ser. No. 10/806,201, filed Mar. 22, 2004, the entire contents of which are incorporated herein by reference.

BACKGROUND OF THE INVENTION

1. Field of the Invention

The present invention relates generally to the field of telecommunications systems and methods. More specifically, the present invention is directed to systems and methods for identifying and/or distributing music and other types of useful information for users in a very simple and convenient manner. A variety of systems and methods are disclosed which provide users with quick and convenient access to various forms of information, such as, for example, audio information including music and news items as well as coupons and other information.

2. Description of the Related Art

Music and other forms of audio information are currently made available to consumers for purchase through retail stores in the form of compact discs, cassette tapes and other tangible media. Audio information is also currently presented to consumers through both radio and television. More recently, audio information has been made available to consumers through the Internet where audio files are downloaded to consumer's personal computers or other electronic devices.

One of the shortcomings of these existing systems is that the consumers who desire to receive a particular artist track or other form of audio information must be aware of both the artist name and the title of the song that the consumer desires to purchase. In the conventional music and audio information distribution systems described above, it is often difficult for a consumer to possess sufficient information in order to know both the artist and the name of a particular song that the consumer wishes to purchase.

For example, this may occur when an individual is listening to the radio while driving a car and the person hears a particular song that he or she finds to be enjoyable. While it is true that most radio stations will identify both the song and the artist for music that has been played by the station, this information is not always readily available and accessible to the consumer. An individual who hears a song played over the radio may be preoccupied with other tasks and therefore be unable to write down the necessary information for subsequently purchasing the song. Alternatively, the consumer may not be paying attention to the broadcast announcer at the time the announcer briefly describes the artist and track or other designating information concerning the desired audio information. As a result, although the individual may wish to purchase this song, he or she is unable to do so without investing additional time to determine the artist and track that is desired.

One additional deficiency of conventional music and other audio information distribution techniques is that they require that the consumer maintain the necessary identifying information until such time as the consumer is ready to purchase the music. Currently, consumers typically go to stores where they purchase CDs which contain the music that is desired by the consumer. This may not occur until several days or even weeks after the consumer has originally heard the song or other audio information. At this later point in time, the consumer may have forgotten or lost the requisite identifying information. As a result, the consumer may not make the necessary trip to the store for purchasing the desired song or other information. While it is true that the Internet has provided consumers with alternate and perhaps more convenient means for purchasing music, even this distribution channel suffers from the same problem which requires that the purchaser possess sufficient identifying information concerning a particular song.

Conventional distribution channels for music also suffer from shortcomings that typically prevent consumers from making spur of the moment purchases of music. As noted above, when a person hears a song over the radio, in order for the individual to purchase the song he or she is required to physically go to a store or log onto a computer in order to obtain the desired music. The problem with these distribution channels is that they typically prevent the user from making an instantaneous decision to purchase a particular song. Consumers will typically not go out of their way in order to make such a spur of the moment purchase. As a result, when the consumer finally is at a store which sells music, the consumer may have forgotten about the song or simply made the decision not to purchase the song. This represents a very significant loss of potential business for the music industry.

Although the Internet has solved some of the accessibility problems of more conventional distribution channels, the Internet has several significant shortcomings in regard to the distribution of music. The primary shortcoming is that consumers may simply download an MP3 file without paying for the music. This represents a very substantial cost to the music industry in lost revenues. In order to overcome this deficiency, the music industry must provide some more convenient means for distributing music to consumers. Accordingly, there remains a need in the field for more convenient distribution channels which are readily accessible to consumers and which provide artist with fair and appropriate compensation for their works.

Thus, there remains a need for systems and methods which provide consumers with simple and convenient mechanisms for providing and maintaining information that identifies the artist and song which is heard by a listener. There also remains a need for systems and methods which provide consumers with convenient access to music that a consumer wishes to purchase.

It has now also been recognized that some of the deficiencies and shortcomings of the conventional music distribution channels are also inherently present in other conventional information distribution techniques. For example, one area of information distribution that suffers from similar shortcomings is in the marketing of products. Conventional advertising techniques which employ radio and television advertisements rely upon consumers to recall the advertisements when they are shopping for products. While print ads provide consumers with the ability to redeem coupons as a tangible reminder of the product, there is no analogous mechanism for radio or television advertisements. Accordingly, there remains a need in the field for systems and methods which provide consumers with convenient access to information on products distributed through television and radio ads.

Yet another shortcoming of the existing radio and television systems is that they do not provide users with the ability to immediately access information relating to a particular news item. For example, an individual listening to a radio station may hear a news item concerning a treatment for a specific medical condition with which the individual is familiar because of a friend or relative who has the particular condition. Currently, the individual who hears the news item is unable to relay any specific information concerning the news item to the person with the medical condition beyond that which the individual is able to remember. Often, this information is forgotten altogether before it is related to the person who is particularly concerned about the information.

It is apparent that there are a number of shortcomings in the existing conventional systems for distributing information including music and news. In light of the foregoing, one object of the present invention is to provide systems and methods that identify and maintain information in a readily accessible format concerning an artist and song that is heard by a radio listener. Another object and advantage of the present invention is to provide systems and methods that allow consumers to have convenient access to music and other types of audio information. Yet another object and advantage of the present invention is to provide distribution channels that are readily accessible to consumers and which ensure that artists receive fair and appropriate compensation for their works. Yet another object and advantage of the present invention is to provide consumers with quick and convenient access to other forms of information such as news items and marketing information such as, for example, coupons.

SUMMARY OF THE INVENTION

In accordance with a first preferred exemplary embodiment of the present invention, a radio, television or other electronic data receiver is provided with a memory that may be utilized for storing information that is sufficient to identify both the artist and a particular track that the listener may wish to purchase. Those skilled in the art will appreciate that the storage of this information may be achieved in a variety of different manners or formats. Additionally, the information that has been stored may be utilized in a variety of different ways in order to provide the user with the desired music or other audio information.

In accordance with a first exemplary embodiment, the systems and methods of the present invention rely upon time of reception information and information identifying the transmitting station in order to determine the particular artist and track that the listener finds to be enjoyable. In accordance with a first preferred exemplary embodiment of the invention, a plurality of radio stations post play list information preferably on one or more web sites that provides a correlation between the time at which a particular track has been played and the station identification information. This information may be used for identifying and/or ordering a particular song. For example, a user listening to a particular station (WXXX) at 3:02 PM on a particular day who hears a song that is of interest to the individual will be able to identify the song with the time of reception and station information by correlating this information with the corresponding play list information.

In a first preferred exemplary embodiment, the user need only access a single web site with the stored transmitting station and time information in order to identify the desired artist and track. In accordance with a preferred exemplary embodiment, a user who hears a particular song that is desirable over a radio enabled with this technology simply presses a button which initiates storage of the transmitting station and time information in an electronic memory that records a designation of the transmitting station and the pertinent time information. In a preferred exemplary embodiment, this information is stored in a flash memory element such as, for example, a Memory Stick or similar flash memory product. Through this technique, the user is able to store a significant amount of information that identifies songs and/or other information that the user desires.

Although a flash memory or EEPROM is preferred due to the non-volatile nature of these memory products, those skilled in the art will appreciate that other alternate data storage devices may be utilized as well including, for example, magnetic media such as hard disk drives, magnetic tape, CDs, DVDs and random access memory (RAM). The radio or other device such as, for example, a television, may have the memory for storing this information built-in or it may be only temporarily connected thereto for the purpose of storing the pertinent information. Those skilled in the art will also appreciate that an interim storage device may also be utilized whereby the information is temporary stored in a first memory and thereafter transferred to a subsequent storage device for ordering the desired song or other information.

Information may also be stored in a memory associated with a remote-control device such as, for example, the remote-control unit of a television. This embodiment is particularly suitable for storing information pertaining to television news items as well as coupons and the like. In such an embodiment, a separate button is preferably easily used for storing information pertaining to the transmitting station and the time at which the information was transmitted. Those skilled in the art will also recognize that a new or dedicated button need not be provided and that the multiple selection of an existing button or the selection of a combination of existing buttons may be utilized to cause the storage of the necessary information. For example, based on protocol the initiation of the storage process could be provided simply by pressing the enter button where no change of channels has occurred. The system could recognize this key selection as a request for storing current channel information and the time as noted.

The stored information concerning the transmitting station and time at which a particular song or other information was played or transmitted by the station is subsequently correlated with information that specifically identifies the artist and song of interest, or news item or advertisement etc. This correlation may be accomplished in a variety of different ways. In accordance with a first exemplary embodiment of the present invention, the user removes a flash memory unit such as, for example, a Memory Stick device or similar product from a radio or other device that is enabled with this technology. The memory device is then inserted into a reader associated with a computer or other processing device that is preferably provided with access to the Internet. The user is then able to access a web site containing the relevant correlation information so that the user may associate a specific artist and song and/or any other desired data with the information that has been stored in the memory device. In accordance with a preferred exemplary embodiment of the present invention, a computer program is utilized in order to automatically provide the user with a list of the desired songs and/or other information. This occurs by automatically accessing one or more web sites that provide the ability to correlate the transmitting station and time information with other relevant data. Those skilled in the art will appreciate that the correlation could be provided in a variety of different ways.

For example, in one exemplary embodiment a fully automated system is able to receive the necessary information from a memory associated with the web site and thereafter automatically process the information in order to provide a user with the option of purchasing music, downloading the corresponding news items and/or associated information as well as automatically receiving electronic coupon data that is associated with an advertisement that was transmitted by a particular station at a specific time.

Those skilled in the art will also appreciate that removable memory media need not be utilized and the entire system may include any necessary hardware and/or software or firmware for ordering the information or music as necessary. Alternatively, the device may be linked directly or indirectly with a further system such as a computer or other data processing device that is preferably capable of interacting with the Internet.

For example, the device incorporating this technology may be implemented as a music storage unit that may include a hard drive or other electronic storage media wherein the device also either includes or maybe interfaced with a network interface card or a wireless connection to the Internet. In such an embodiment, the device would preferably automatically be capable of accessing the necessary correlation information that is preferably provided in a memory associated with a web site for identifying a particular song and/or other desired information and thereafter automatically transferring the music or other relevant information to a further storage media that is preferably associated with the device.

As a result, the user is able to identify one or more songs or other information that the user may be interested in purchasing. Advantageously, the web site that is capable of interacting with the device and which may be used for requesting the information is preferably configured to provide the user with the ability to purchase the desired music in a variety of different ways.

In accordance with one option that is provided in the preferred exemplary embodiment, the user is able to request and pay for a download of the complete song or other information. Prior to ordering, the user may be presented with the ability to review the data or song(s) and/or portions thereof. The song or other information may be transmitted to the user for storage on a memory associated with either the original device or another electronic system preferably after payment has been secured. In alternate embodiment the user may request that a personalized compact disc be created containing each of the desired songs. The ordering web site may also provide the user with the ability to listen to other songs from the identified artists so that similar songs may be purchased as well in a similar fashion. Alternatively, the web site will provide the user with the ability to order the complete original artist disks containing the songs that the user previously designated as being desirable.

In one preferred exemplary embodiment, the user is provided with a subscription to a service which allows the user to download a certain limited number of songs and/or other information over a fixed amount of time. Alternatively, payment may be used to enable download of a fixed amount of data.

In yet another alternate preferred exemplary embodiment, the user's system is provided with software that will automatically generate an electronic mail message with an attachment, file or other message or another automated transfer of information preferably through the Internet that contains the pertinent transmitting station and time information. In accordance with this alternate preferred exemplary embodiment, the user is able to purchase songs without having to interact directly with a web site. In this preferred alternate exemplary embodiment, the software which is preferably operating on the user system provides the user with the ability to selectively order either individual tracks, complete original artist disks, or customized disks containing user selected songs.

In accordance with a further alternate exemplary embodiment, a telephone that is preferably Web enabled may be designed to interact with the memory element in order to generate and transmit a message requesting identification and/or the purchase of particular audio tracks. As noted above, in any of these embodiments, the song or other information may be automatically transferred to the user device or another user specified location such as, for example, a personal computer that is connected to the Internet or which is capable of receiving an electronic mail message containing the requested information.

In accordance with yet another alternate preferred exemplary embodiment, the user is able to bring in the memory element or device to a store that sells music. In accordance with this exemplary embodiment, the store will provide a computer or other reading device for reading the relevant station and time information in order provide correlation between the transmitting station and time as well as the desired artist and track. The user is then able to purchase the identified songs directly from the store either as original artist disks or as customized disks that the store provides which have been recorded with the desired songs. Alternatively, the store may simply order the customized disks containing the desired songs for subsequent delivery to the user.

It has also been recognized that it is desirable to provide systems and methods for retrofitting existing radio systems with the capability of providing users with convenient systems and methods for identifying and ordering audio information. In accordance with one such alternate exemplary embodiment, the user is able to identify a particular song of interest simply by pressing a button on an electronic box. The box includes circuitry for designating a particular radio station and preferably includes its own clock for user convenience. In accordance with this exemplary embodiment, the user presses a button to designate selection of the current time and a keypad is provided for the user to enter numeric designations for the station identification. The box includes a memory for storing this information and preferably includes a removable memory element such as, for example, flash memory embodied as a Memory Stick or similar product. The unit may also preferably include preset buttons similar to car stereos which may be used to more quickly designate a desired transmitting station. The stored information may subsequently be utilized in order to conveniently identify desired songs for purchase.

In accordance with yet another alternate preferred exemplary embodiment, an aftermarket product such as the box described above alternately includes a transmitting element. The transmitting element is activated when the user presses the memory activation button to select a desired song. By pressing the button user has designated the relevant time information based on the internal clock of the system. The transmitting element is utilized to transmit a low-power FM signal that may be swept across the entire FM band. Alternatively, the channel or station identifying signal is preferably transmitted at only a selected number of limited frequencies corresponding to the limited number of stations that are usually tuned by the user. The transmitting element preferably transmits one or more tone pulses at each frequency and the box includes a microphone and decoding circuitry to identify when the tone signals have been received. When this occurs, the system can automatically identify the transmitting station and the identified time and transmitting station is thereafter stored for subsequent retrieval.

In yet another preferred alternate exemplary embodiment, an automated telephone service is provided for automatically generating the desired artist and track information based on user entry of transmitting station information and information identifying the time of the desired transmission. The user is able to interact with this automated telephone system to purchase the desired song or songs in similar fashion to the previously described systems. The user is able to selectively purchase either an entire original artist disk or only selectively identified songs. Similar to the embodiments described above, a user could purchase a system subscription that entitles the user to purchase a certain number of songs over a given period of time, for example. The system then provides the user with a hard copy of a disc containing the desired information or the desired music and/or information may be transmitted to the user via the Internet as an attachment to an electronic mail file or the user may be allowed to download the requested music and/or other data via a secure web site.

As noted above, it has now been further recognized that the systems and methods of present invention have broader applications beyond the music industry. For example, in yet another alternate preferred exemplary embodiment, users are able to designate news stories or sports information in similar fashion. Specifically, for example, users are able to simply push a button on an enabled radio or aftermarket product and designate relevant time and transmitting station identification information. The information is then utilized for the purpose of transmitting the complete story as well as related information electronically to the user. Additionally, the transmitted information may also include further links or yet additional information that is relevant to the particular story. The recipient is then able to read all of the relevant information and/or forward this information to other individuals who may be interested in the information.

For example, this alternate preferred exemplary embodiment of the present invention may be particularly useful for those who listen to news stations. When a particular story comes on the radio in which the user has a particular interest or is aware of other individuals who may be interested in the story, the user simply presses the button to record the transmitting station and time information. The complete story and/or other pertinent information may then be subsequently downloaded from a web site that provides correlation between the designated transmitting station and transmission time information and the relevant text or other information. Such a system could either be funded through additional advertising revenue associated with the Web interface of the download a web site or the user may be requested to pay for a subscription to the data as noted above.

In yet another alternate preferred exemplary embodiment of the present invention, it has also been recognized that marketing information may be similarly transmitted to recipients. This information can be extremely valuable to both consumers and the companies who advertise products. In accordance with this alternate preferred exemplary embodiment, users may be provided with the opportunity to generate coupons or other similar discounts on desired products based on interaction with this technology. For example, when a person listening to a radio hears an advertisement for a product in which the user is interested, the user may be provided with the option of pushing the button to designate the relevant information and the user will be able to access a web site which provides correlation between transmission station time and product advertisement information. This may be subsequently utilized in generating discounts for consumers as well as providing valuable feedback information concerning the effectiveness of advertising through particular media.

In yet another alternate exemplary embodiment, similar technology is utilized to generate coupons or other discounts in conjunction with the remote control of a television. In this alternate preferred exemplary embodiment, when an advertisement is transmitted over a particular channel, the user simply hits a button on the remote control which designates the advertisement as being of interest to the individual. This information is subsequently stored for later use in generating discounts or a coupon for the recipient. Because both the station information and time are recorded, the seller is able to receive significant information which would otherwise be unavailable. This information can be extremely useful in developing subsequent marketing campaigns.

The systems and methods of the present invention may be utilized for the purpose of ordering other information including such things as, for example music videos and the like. Furthermore, the systems and methods described herein are not limited to the specific physical embodiments and the expressly defined information which is provided to users as described herein.

The following detailed description provides yet additional information concerning specific implementations, however, these exemplary embodiments should not be considered in anyway limiting as to utilization of the concepts of the present invention.

DETAILED DESCRIPTION OF THE PRESENTLY PREFERRED EMBODIMENTS

Figure 1:
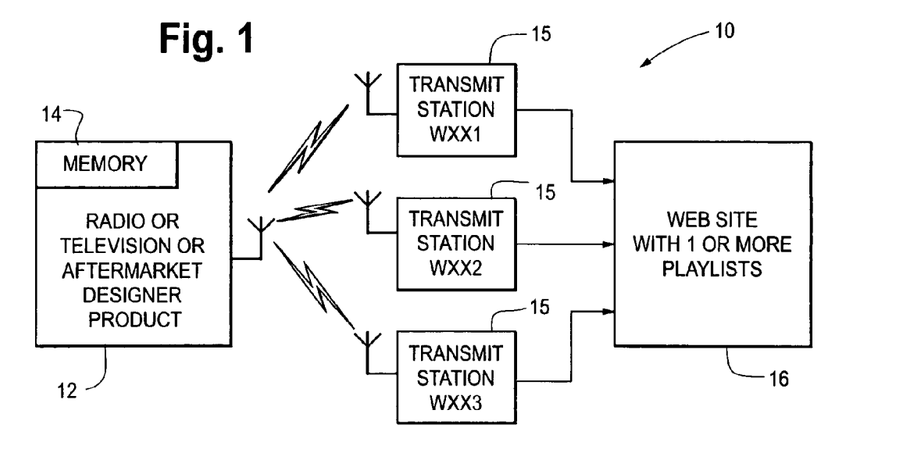
FIG. 1 illustrates a first exemplary embodiment of the systems and methods of the present invention.

FIG. 1 illustrates a first preferred exemplary embodiment of the present invention which is shown generally at 10 wherein a radio, television or other receiver 12 is provided with a memory element 14 which is utilized for storing information that is sufficient to identify both the artist and a particular track and/or other information that the user may wish to purchase or otherwise receive. As noted above, the storage of this information may be achieved in a variety of different manners. Additionally, the information that has been stored may be utilized in a variety of different ways in order to provide the user with the desired music or other information. Preferably, computer software or firmware is utilized to control a microprocessor in the device in order to automatically store the identifying information such as, for example, the time of transmission and currently tuned station information. The user is able to effect storage of this information preferably by pushing a single button or a combination buttons on the device. Additionally, storage of this information by the user could be triggered in any number of known ways in which to indicate that desired data should be stored.

In accordance with the first exemplary embodiment, the systems and methods of the present invention rely upon time of reception information and information identifying the transmitting station in order to determine the particular artist and track that the listener finds to be enjoyable as well as other information that may be of interest to the listener or viewer.

In accordance with the first preferred exemplary embodiment of the invention, a plurality of radio stations or other transmitting entities 15 post play list information preferably on a single web site 16 that provides a correlation between the time at which a particular track has been played and the station identification information. This information may be used for identifying and/or ordering a particular song. For example, a user listening to a particular station (WXXX) at 3:02 PM on a particular day who hears a song that is of interest to the individual will be able to identify the song with the time of reception and station information simply by pushing a single button that automatically records this information.

More specifically, in accordance with this exemplary embodiment a user is able to simply hit a record button associated with the radio or television 12 that causes the device to store the current time and tuner or channel/station information in the memory 14 associated with the device. This allows the user to conveniently maintain information relating to songs that are particularly interesting and/or other important information such as, for example, a new story or information concerning a new product or other advertisement and/or coupon. Although additional information could be stored, this is not necessary as the user is able to subsequently discern the requisite information at a later time based on this initial limited amount of data.

The user is able to conveniently designate a variety of coupons, news items and/or music for subsequent purchase, downloading and or review. As noted above, the memory 14 is preferably comprised of a nonvolatile memory such as, for example EEPROM or flash memory so that the designated information may be maintained even after the device 12 is turned off. Advantageously, the user is able to conveniently accumulate the identifying data over virtually any period of time. At the user's convenience, the user is able to access the desired corresponding information. As noted above, in the preferred exemplary embodiment this is accomplished by access to the web site 16.

Those skilled in the art will appreciate that one or more web sites may be utilized but it is preferable that a single web site be utilized to maintain all of the information. This maybe accomplished by the cooperation of participating radio stations or other transmitting entities that simply transfer their respective play list and transmission time information to a common entity so that the single entity may utilize the play list information in order to compile a master listing so that many users could simply access a single site in order to acquire any desired music information or coupons regardless of the original transmission source.

It should be appreciated that this is not necessary and that a user could access a plurality of sites that would have the requisite information. For example, in an alternate arrangement, each of the transmitting stations participating in the program may desire to receive revenue based on orders generated from consumers who have listened to their particular station. Accordingly, in an alternate arrangement a computer program is utilized in order to automatically access the necessary information from a plurality of web sites. More specifically, in such an embodiment, the computer program utilized in ordering the desired information is programmed to access web sites corresponding to each of the transmitting stations that have been recorded by the system so that the desired information may be determined based upon transmission time data. In this alternate arrangement, each of the transmitting stations may also derive revenue based upon user volume and/or sales transactions associated with the stations ordering web site.

Regardless of the specific implementation, it should be recognized that greater or lesser degrees of automation may be utilized for transferring the information of interest. More specifically, the systems and methods out of the present invention may be implemented via a fully automated system wherein once the user has designated certain songs or other information as being of interest, the system may be programmed to automatically download these designated songs or the other information of interest to an electronic memory of a user device. Alternatively, in a less automated approach, a web site may request that the user specifically designate those songs or other items of information for purchase. The user may be provided with the ability to specifically designate an item for purchase or downloading after additional preview. In such an exemplary implementation of the system, the user may be required to manually enter or otherwise specifically designate (such as by clicking the cross-referenced items on a web page) the desired songs or other items of information for preview and/or purchase.

In a first preferred exemplary embodiment, the user need only access the web site 16 with the stored transmitting station and time information in order to identify the desired artist and track by correlating this information through use of the play list and transmission time data that is maintained in the memory associated with the web site 16. In accordance with the preferred exemplary embodiment, a user who hears a particular song that is desirable over a radio enabled with this technology simply presses a button which initiates storage of information (currently tuned station and current time data) in an electronic memory As noted, although a flash memory or EEPROM is preferred due to the non-volatile nature of these memory products, those skilled in the art will appreciate that other alternate data storage devices may be utilized as well including, for example, magnetic media, CDs, and random access memory. The radio may have the memory built-in or only temporarily connected such as when a removable memory device is utilized.

The stored information concerning the transmitting station and time at which a particular song was played by the station is subsequently correlated with information that specifically identifies the artist and song of interest. This may be accomplished in a variety of different ways. In accordance with an exemplary embodiment of the present invention, the user removes a flash memory unit such as, for example, a memory stick device or similar product from a radio or other device 12 that is enabled with this technology.

Figure 2:
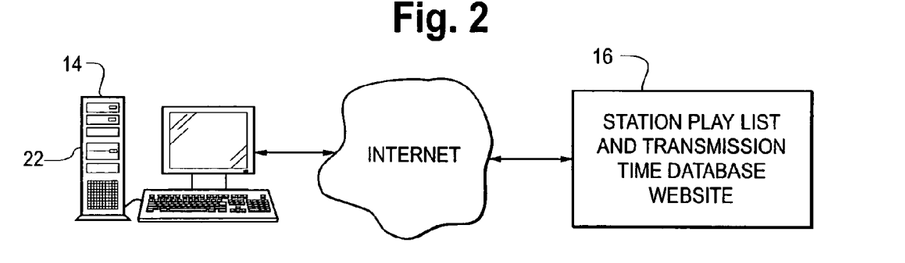
FIG. 2 illustrates a second exemplary embodiment of the systems and methods of the present invention.

FIG. 2 illustrates use of the device when ordering music or other desired information after the stored transmitting station and time data has been compiled in the memory 14. In accordance with this preferred exemplary embodiment, the memory device 14 is removed from the user device 12 illustrated in FIG. 1 and inserted into a reader associated with a computer 22 that is preferably provided with access to the Internet as shown. The memory 14 preferably contains data representative of a plurality of time of transmission entries and corresponding transmitting station/channel information or frequency of transmission information. This data is stored by the device each time the user designates that a particular transmitting station is transmitting information of interest. By hitting a button, for example, the device automatically stores the requisite information.

It should be recognized by those skilled in the art that it is not necessary to utilize a removable memory which is removed from a user device and subsequently inserted into a computer such as the computer 22 illustrated in FIG. 2. More specifically, in an alternate arrangement, the user device may itself be capable of automatically interfacing with the Internet and a fully automated version of the device may be capable of independently automatically downloading user designated information including music. Alternatively, the device itself may be capable of interfacing with a personal computer such as through a USB connection, infrared link, wireless network connection or any other direct or indirect data transmission.

In accordance with the illustrated exemplary embodiment, once the user has connected the memory 14 with the computer 22, the user is then able to access a web site 16 containing the relevant correlation information so that the user may associate specific artist and tracks or other desired information with the transmission time and station of transmission information that has been stored in the memory device 14. Those skilled in the art will appreciate that the memory device 14 need not be removed from the initial receiving device 12 and that the radio or television or other user device 12 may be used to directly interface with the web site 16 provided that the device 12 has the capability of interfacing with the Internet or some other device that is so capable.

A computer program that is implemented on the user computer 22 or the device of the alternate embodiment is preferably utilized in order to provide the user with a list of the desired songs and/or other information that has been correlated with the compiled data initially stored in memory 14. In accordance with the preferred exemplary embodiment the computer program operating on computer 22 initially determines the transmitting station information for a first data entry. The transmitting station information may be stored directly in the memory device 14 by the user device 12 for subsequent access. Alternatively, this information may be determined by the computer 22 based upon stored frequency of transmission data or channel of transmission data. Regardless of whether it is stored by the user device or subsequently determined, it is necessary to perform some analysis in order to accurately determine a transmitting station.

More specifically, the actual station of transmission information cannot be determined based upon frequency of transmission or tuned channel information because neither television channels nor radio frequencies have uniform designations throughout all geographic regions of the United States or other countries. This is due to the typical reuse of transmission frequencies for radio and television transmitting stations throughout the country. Accordingly, it is necessary to correlate frequency of transmission and channel of transmission data with an actual radio or television station. In an alternate arrangement this information could simply be otherwise designated.

In order to provide this correlation, in the preferred exemplary embodiment, a user is requested to enter ZIP code information. It should be recognized that other geographic information could be utilized as well such as a user's city or other geographic designations including latitude and longitude, for example. Additionally, it may be necessary to request that the user provide information concerning whether the data was acquired by a user device receiving transmission through a cable or satellite system. These requests are preferably performed by the computer 22 so that it may make the necessary determination which correlates frequency of transmission and channel of transmission with an actual radio or television transmitting station. In order to perform the correlation, simple lookup tables, database entries or other known or developed data storage techniques are preferably used by the computer 22. These lookup tables may be stored in a memory associated with the computer 22 or they may be accessed from a remote web site which maintains this information.

This aspect of the system operation simply provides the identification of the specific transmitting station based on the user device tuner information. In recognition of the fact that different cable or satellite broadcast service providers transmit different stations over different channels or frequencies, in a system that is compatible with these broadcast systems, users are requested to specify whether they subscribe to cable television or some other service so that the actual transmitting entity may be identified.

Regardless of how or where the transmitting station identification data is stored, the user is able to identify a specific transmitting station based upon the stored tuner information and the geographic designation. It is preferred that the computer 22 perform the correlation because this information changes periodically and it will be very easy for the computer program operating on computer 22 to periodically confirm the correlation data and/or update this information. For example, the transmitting station information will change when one station assumes the transmitting frequency of another. It should be apparent that if a further web site is used as noted above, it is not necessary for the computer 22 to perform the update. Rather the above-mentioned web site will be preferably programmed to periodically request transmitting station confirmation information to ensure the integrity of the system.

It should be specifically recognized that the task of identifying the specific transmitting station can be performed either by the user computer 22, the web site computer 16 which provides access to the list information, the original user device 12 or even some other processing unit.

In the preferred exemplary embodiment, the user device 12 will simply store in memory 14 tuner information such as the currently tuned frequency of a radio or the currently tuned channel of a television. Thereafter, the system, preferably through use of computer 22 will specifically identify the transmitting station for a specific entity. After the computer 22 has identified the transmitting station for a plurality of user request entries and preferably all of the currently outstanding user specified entries stored in the memory 14, the computer 22 is programmed to interface with the web site 16 in order to specifically identify the information of interest based upon the precise transmitting station information and the time of transmission data.

It should also be recognized that the web site 16 and/or a computer associated with the web site 16 may provide the necessary correlation calculation between the stored frequency of transmission or channel transmission data stored in the memory 14 and the actual transmitting station. In such an alternate embodiment, all that is required is that the web site 16 or the computer associated with the web site be provided with the lookup table information noted above and the user's geographical data. It is preferred that the user's computer 22 perform the specified determination.

Regardless of how or where the determination of the precise transmitting station is made, the computer 22 is thereafter able to identify the specific information of interest based upon a correlation with information contained in a further database that is preferably maintained in a server associated with the web site 16. This final correlation may be performed by either the computer 22 or another computer or processing device associated with the web site 16. The database which is preferably associated with web site 16 contains, for example, the station play list and transmission time information. This database may alternatively contain information designating the transmission of an advertisement and/or news item at a particular time by a particular transmitting station.

In accordance with the preferred exemplary embodiment, the system, the user is then able to preferably selectively order and/or download any songs or other useful information. At this point, the system may allow the user to preview a portion of the song and or other songs prior to ordering. It should also be recognized that a single web site containing all of the requisite information is not necessary and that other arrangements are possible as noted above.

Figure 3:
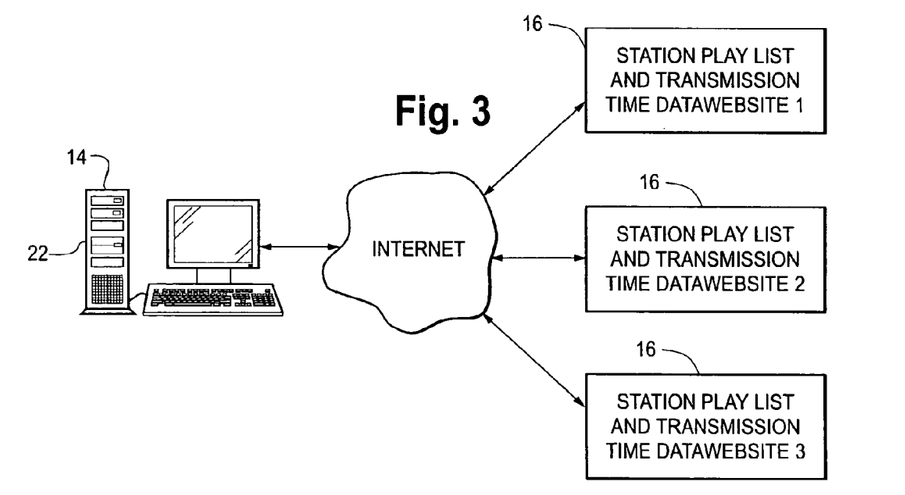
FIG. 3 illustrates a third exemplary embodiment of the systems and methods of the present invention.

For example, FIG. 3 illustrates an alternate preferred exemplary embodiment wherein a plurality of individual web sites that each contain station play list and transmission time data are provided. This embodiment is useful in situations where each transmitting station has not agreed to transfer its prior play list and transmission time data to a common source. In this arrangement the computer 22 preferably runs a computer program which enables a user to identify each of the web sites 16 associated with the transmitting stations that have been designated as being associated with the frequency of transmission and/or channel of transmission data recorded into memory 14. This can easily be accomplished by automatically identifying the appropriate web site associated with each transmitting station. More specifically, in the preferred exemplary embodiment a database is utilized or some other memory construct which provides the necessary correlation.

It is important to recognize that the specific transmitting station information need not be designated and stored in memory 14. However, it may be stored as noted below. All that is necessary is the tuner information and the time of transmission data. When this information is designated, the computer program running on computer 22, one of the web sites with which the user interacts or some other computer, or alternatively another microprocessor controlled user device is preferably programmed to identify the specific transmitting station by correlating the stored tuner information with the particular geographic region within which the user is located. For example, this may be easily accomplished by having the user enter into the computer 22 a ZIP code, city or other current location information. Data correlating transmitting station with frequency of transmission for particular ZIP code may be readily be provided through the Internet for this purpose. More specifically, by identifying ZIP code information or other geographical data one could easily identify the transmitting station associated with a particular frequency of transmission for that ZIP code as noted above. Alternatively, the specific transmitting station data may be directly recorded in the memory 14.

Similarly, television channel information could easily be correlated with actual station of transmission station based on ZIP code data and whether the user obtains programming through cable television or some other form of transmission. Once this information has been determined, it is a trivial matter to identify the web site associated with a particular station for the necessary interaction. This may ultimately be accomplished through interaction with a further web site. In any event, through the use of data presented on one or more web sites, users are able to obtain the necessary correlation in order to identify the specific information of interest for ordering and or downloading.

It should also be recognized that the step of correlating a specific transmitting frequency or channel with an actual radio or television station or other entity can be eliminated in an alternate exemplary embodiment wherein the user device itself is preferably programmed to automatically provide the transmitting station correlation information. For example, in an embodiment wherein a remote-control unit of the television or a radio device is utilized, the device may be programmed to automatically associate a specific transmitting station such as, for example, (W. X. X. X.) with a particular tuned frequency or channel. This correlation could be performed based upon user entered data. For example, when initially programming the device, the user may be requested to enter in a specific station identification for a particular channel, frequency or preset. Accordingly, in such an embodiment, the intermediate step of subsequently correlating this data with the original tuner information is not necessary.

It should also be noted that there are other ways of performing the intermediate task of identifying the specific transmitting station of interest in order to identify the specific web site containing the further correlation information specifying the transmitted data and transmission time information. For example, in a further alternate embodiment, the system is able to identify the appropriate web site containing the desired further correlation information based upon the specified transmitting station information and the user's geographical data. Specifically, this may be accomplished through interaction with a web site containing a database that correlates the frequency or channel of transmission data and the user's geographical information directly with the web site containing the appropriate stored data. Such an arrangement would eliminate the need to specifically identify a particular transmitting station.

Figure 4:
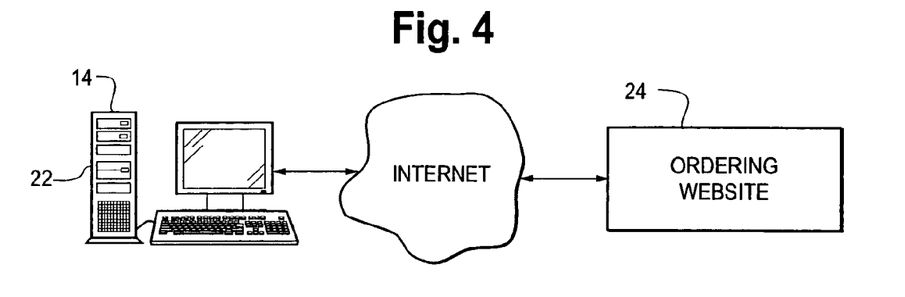
FIG. 4 illustrates a fourth exemplary embodiment of the systems and methods of the present invention.

FIG. 4 illustrates the actual ordering and/or requesting of the music or other information of interest by a user. Once a user has identified one or more songs or other information which the user desires to access, the user then interfaces with an ordering web site 24 via the user computer 22. The ordering web site may actually be the same web site previously designated 16 or yet an additional web site. In an embodiment wherein the ordering web site 22 is the same as the web site 16 which provides the correlation information, the user may be provided with an example of the music or other information that has been previously designated by correlating the time of transmission information with the transmitting station information. More specifically, the user may be provided with a link that provides the user with access to a portion of the song to confirm that the user wishes to purchase the entire track. Additionally, the user may be provided with other tracks from the same album or other songs from other albums by the same artist for ordering.

It should also be recognized that the ordering web site 24 actually be embodied as a kiosk or other standalone unit which preferably includes its own processing device in order to provide the user with a correlation between the original data stored in the memory 14 and the information of interest. In such an embodiment, the user may actually associate the memory 14 with the ordering web site or other computer device. Alternatively, the user may actually bring in the radio or other aftermarket product to physically connect with or otherwise interact with the ordering device 24.

In an alternate preferred exemplary embodiment, the user is able to request custom CDs. This may be performed either online or directly at a kiosk or other location. In yet another embodiment, the user is able to download the music into a personal music storage device such as an Ipod or other listening device. In such an embodiment, the memory 14 may actually be the hard drive or other memory within which the actual data of interest is stored or may be a separate memory that is otherwise associated with the device or radio. In such a device the music can be categorized or inserted into play lists that are desired by the user. As noted above, the information that may be accessed and/or downloaded by a user includes such other forms of data as news items and any corresponding supporting information such as technical literature and the like. Users may also download coupons and/or coupon or other discount related information that correspond to advertisements that were transmitted by a station designated by the user with the device.

In an alternate embodiment, the user is able to access a separate Web site 24 that automatically orders the song or other information for the user based upon the identifying information previously stored in the user device containing the user designated time and tuner or station of transmission information. In this alternate embodiment, the user may also be automatically presented with some of the information related to the designated data so that the user may make a final decision as to whether he or she wishes to purchase or otherwise download the song or other information. For example, the user may be presented with a part of the song that may be ordered.

Through the use of the devices described above, the user is able to identify one or more songs and/or other information that the user may be interested in purchasing. Advantageously, the web site 24 is configured to provide the user with the ability to purchase the desired music in a variety of different ways. In accordance with one option that is provided in the preferred exemplary embodiment, the user is able to request that a personalized compact disc be created containing each of the desired songs. The web site or other ordering location/device may also provide the user with the ability to listen to other songs from the identified artists so that similar songs may be purchased as well in a similar fashion. Alternatively, the web site or user ordering device will provide the user with the ability to order the complete original artist disks containing the songs that the user previously designated as being desirable.

Figure 5:
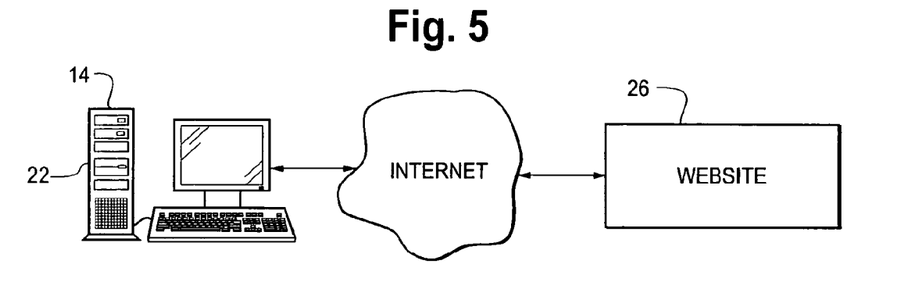
FIG. 5 illustrates a fifth exemplary embodiment of the systems and methods of the present invention.

In an alternate preferred exemplary embodiment, the user computer 22 is provided with specialized computer software that will automatically generate an electronic mail message with an attachment, file or message that contains the pertinent transmission source and time information for ordering the music or other information. This is illustrated in FIG. 5. In accordance with this alternate preferred exemplary embodiment, the user is able to purchase songs without having to interact directly or automatically with a web site. In this alternate embodiment, ordering is accomplished simply by transmitting an electronic mail message or other message from the user computer 22 to another entity such as a computer or web site 26 which will respond by transmitting the desired information back to the consumer in a desired format. In such an embodiment, the correlation is performed in similar fashion to that described above with reference to the alternate embodiments.

For example, a user of such a system will preferably access a computer 22 or other electronic devices that includes a computer program or other software or firmware which preferably automatically generates an electronic mail message or other electronic message that contains the relevant stored transmission data. In response to this message, a receiving web site or other computer 26 may be used to automatically transmit the desired song or other information as a response that corresponds to the transmission source and time data that was sent via the electronic mail message. This embodiment is particularly suitable for ordering coupons because the user is not required to purchase the item but rather simply receive the coupon corresponding to the transmitted commercial. In this embodiment, it is preferred that the computer program automatically generate a message or attachment in a predetermined format so that the receiving device may more readily process the request for information generated by the user computer 22 or the actual user device as noted above. Specifically, for example, the user device such as the radio television or remote control may actually directly interact with an ordering unit.

More specifically, in this embodiment illustrated in FIG. 5, the user is able to automatically order any desired information based on the initial correlation designating the desired data to be received based upon the transmission time and transmitting frequency or channel information. In this particular embodiment is particularly preferred that a remote-control device such as a remote control device for a television be connected to the computer 22 through a USB port. The use of the remote control embodiment is particularly suitable for identifying coupon information. For example, this may occur when a user is watching a television program and an advertisement indicates that a coupon is available through the system if the user presses the designated remote-control button or combination of buttons. As noted above, user selection of an advertisement may be accomplished simply by selection of the enter button without an alternate channel selection. The currently tuned channel or transmitting station information and time information would then be stored in a memory associated with the remote-control or even the television or radio itself.

Figure 6:
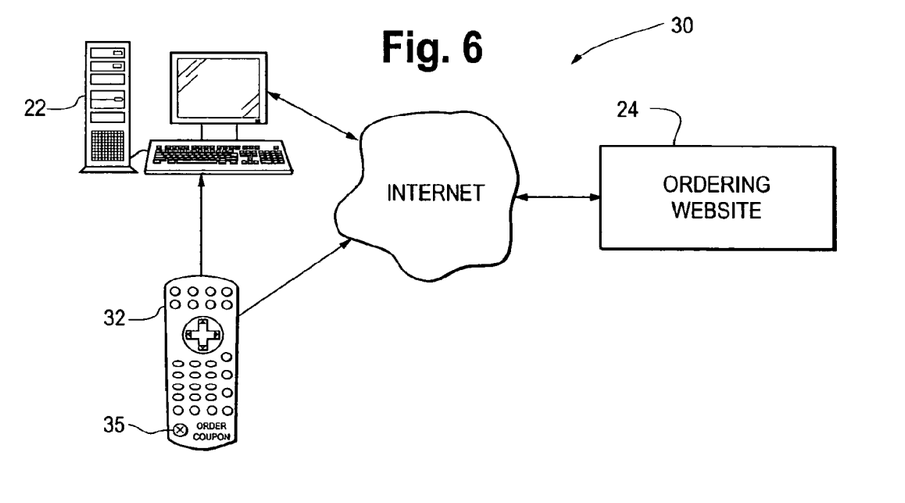
FIG. 6 illustrates a sixth exemplary embodiment of the systems and methods of the present invention.

FIG. 6 illustrates this alternate exemplary embodiment of the present invention which is shown generally at 30. In this exemplary embodiment a remote-control unit 32 includes a memory device that is not shown for the sake of convenience. The internal memory device of the remote-control unit 32 preferably is comprised of EEPROM or flash memory so that there is no data loss if there is a loss of power such as when the battery runs out. However, other types of memory may also be utilized. The device also preferably includes a clock which may be utilized for designating time of transmission information. The memory device may be removable flash memory as noted above or in an alternate embodiment the remote-control unit itself may interface directly with a computer such as the computer 22 or other device capable of interacting with the Internet. Alternatively, communication may be made directly with an intelligent remote-control 32 that itself includes a network interface card or the like or it may interface with a computer via a USB connection or an infrared link or other hardwired or wireless connectivity. In a further alternate embodiment, the device may access additional information via telephone lines.

In this preferred exemplary embodiment, the remote-control also alternately includes a specific coupon ordering button 35 that is used for designating when an advertisement has indicated that such a coupon is available. As noted above, based on convention, the system may automatically designate the current time and channel information for storage whenever the enter button is selected without a change of the channel. Alternatively, based on convention, a user may selectively request a coupon or other discount that may be associated with a particular advertisement. It should be apparent that it is not necessary that the advertisement provide such an indication. The user of such a device could simply designate advertisements that were viewed and which the user would like to receive either additional information or discounts for the product.

After user has designated one or more products for which the user would like to receive either additional information or the actual coupon, the user then either removes a memory from the remote unit 32 or otherwise interfaces the remote-control unit 32 with the Internet so that any necessary web site may be accessed. For example, the web sites include web sites which provide the necessary data correlation information or the actual ordering web site. FIG. 6 illustrates alternative possibilities for interfacing the stored data with the ordering web site 24 via the Internet. This embodiment is also particularly suitable for identifying news stories that may have additional information of interest for the user. More specifically, a news item describing a new medical procedure or potential cure for an illness may provide links to additional information including, for example, any supporting technical literature. The user of the system is thus to access the original news item as well as this additional information in the same manner that songs are accessed and ordered.

In the embodiment illustrated in FIG. 6, it should also be noted that it is not necessary for the remote-control unit 32 or its removable memory to be directly interfaced with a computer or other device for interaction via the Internet. Particularly where coupons are concerned, the user may actually bring the entire remote-control unit 32 or its removable memory device into a store so that the appropriate discount may be directly applied when purchasing products. In utilizing this approach, a computer at the store would simply download information from the remote control unit 32 or memory device which identifies the coupons viewed by user based upon the transmission time data and transmitting station identification or tuner data. The computer unit at the store would then perform the necessary correlation information in order to identify coupons for the user. In alternate arrangement, this process may be performed in advance whereby an account with a particular store or other entity is created and a computer program provides interaction with the stored data so that coupon data or other advertising premiums can be credited to a user account. This user data may then be utilized by the store for providing appropriate discount based on user purchases at the store or remotely, for example, via the Internet.

It will be readily apparent to those of ordinary skill in the art that the remote-control 32 unit will be able to easily designate a currently viewed station based upon previous user entries designating channels to be viewed prior to selection of the order coupon button. It should also be apparent that a special button 35 need not be provided and that a user may be instructed to invoke a series of keystrokes in order to order the coupon for a particular product advertisement. This particular exemplary embodiment is also particularly suitable for obtaining marketing information based upon the actual user response and use of these electronic coupons based upon advertisement designation. Actual electronic coupon usage can be compiled and used for identifying those advertisements that are particularly persuasive and well-placed based upon actual consumer response. This is easily accomplished by accumulating the actual usage data from the stores. The compilation of this data can be acquired via a web site such as the web site 16 described above or directly at a store, for example. It should also be noted that the memory described in relation to the remote unit 32 for storing user designation data could actually be located on the user device or even an aftermarket unit.

In accordance with a further alternate exemplary embodiment, a telephone that is preferably Web enabled may be designed to interact with the memory element in order to generate and transmit a message requesting identification and/or the purchase of particular audio tracks and/or other information such as coupons and like. This is described in more detail below with reference to FIG. 9.

In accordance with yet another alternate preferred exemplary embodiment, the user is able to bring in either the entire user device 12 illustrated in FIG. 1 or the memory element 14 associated with the device to a store that sells music. In accordance with this exemplary embodiment, the store will provide a computer or other reading device for determining the relevant transmitting station and time information in order provide correlation between the transmitting station and time as well as the desired music. This determination is preferably based upon the data correlation described above. The user is then able to purchase the identified songs directly from the store either as original artist disks or customized disks that the store provides which have been recorded with the desired songs. Alternatively, the stored may simply order the customized disks containing the desired songs for subsequent delivery to the user.

Figure 7:
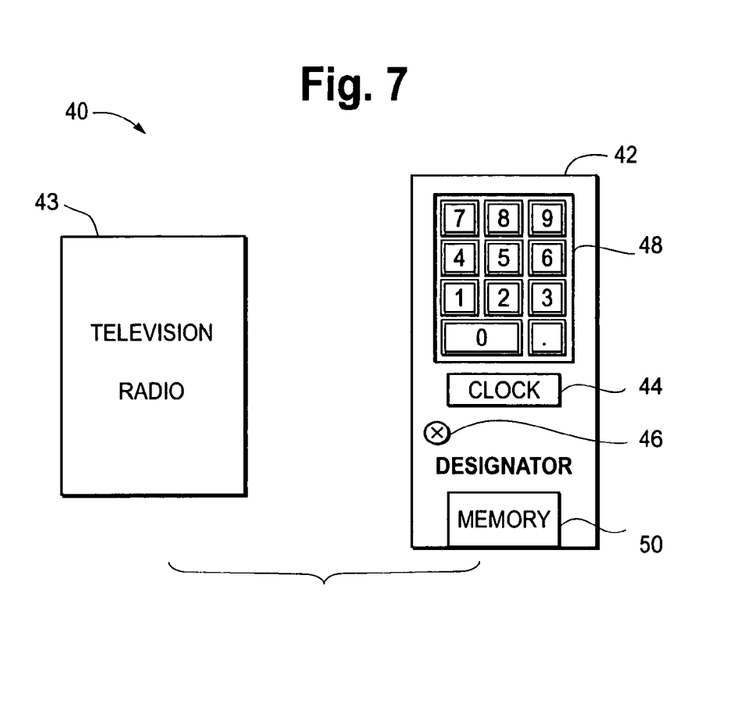
FIG. 7 illustrates a seventh exemplary embodiment of the systems and methods of the present invention.

It has also been recognized that it is desirable to provide systems and methods for retrofitting existing radio systems and televisions with the capability of providing users with convenient systems and methods for identifying and ordering audio information. One such alternate exemplary embodiment is illustrated in FIG. 7 with reference to the system 40. In accordance with one such exemplary embodiment, the user is able to identify a particular song of interest simply by pressing a button on a designator box 42. The aftermarket designator box 42 is preferably separate but also alternatively may be connected to a conventional radio or television 43 which is not directly enabled with the technology of the present invention. The station designator box 42 includes circuitry for designating a particular radio or television transmission station and preferably includes its own internal clock 44 for user convenience. However, it is recognized that the user could actually enter in the time of transmission information as well for subsequent storage.

In accordance with this exemplary embodiment, the user presses a button 46 on the designator box in order to designate selection of the current time and a keypad 48 is preferably provided for the user to enter alphanumeric designations for the station identification whenever a user hears a particular song from the radio or television 43 that is of interest to the user. The designator box 42 includes a memory 50 for storing the currently tuned station and time of transmission information and preferably this memory element is embodied as a removable memory element such as, for example, flash memory such as a Memory Stick or similar product. The unit may also alternatively preferably include preset buttons similar to conventional car stereos which may be used to more quickly designate a desired transmitting station. The stored information may subsequently be utilized in order to conveniently identify desired songs for purchase and for designating other information to be downloaded as described in detail above. It should also recognized that unit itself may interface directly with a computer such as the computer 22 or other ordering device c that is preferably apable of interacting with the Internet for the purpose of ordering songs or other information of interest. Alternatively, communication may be made directly with an intelligent remote-control 32 that itself includes a network interface card or the like our may interface with a computer via a USB connection or an infrared link or other hardwired or wireless connectivity.

In an alternate embodiment, the aftermarket designator 42 replaces the keypad 48 or additionally includes an infrared signal detector. In this alternate arrangement, which is preferably utilized with televisions, the user is able to designate the type of remote-control signaling protocol utilized by the user so that the device 42 may be able to automatically receive the necessary tuner information. In such a device, the clock 44 provides the necessary time of transmission information whenever the user requests designation of desired information.

This embodiment of the system allows users to designate songs or other information of interest without having an entirely new radio or television system that is independently capable of storing the relevant data.

Figure 8:
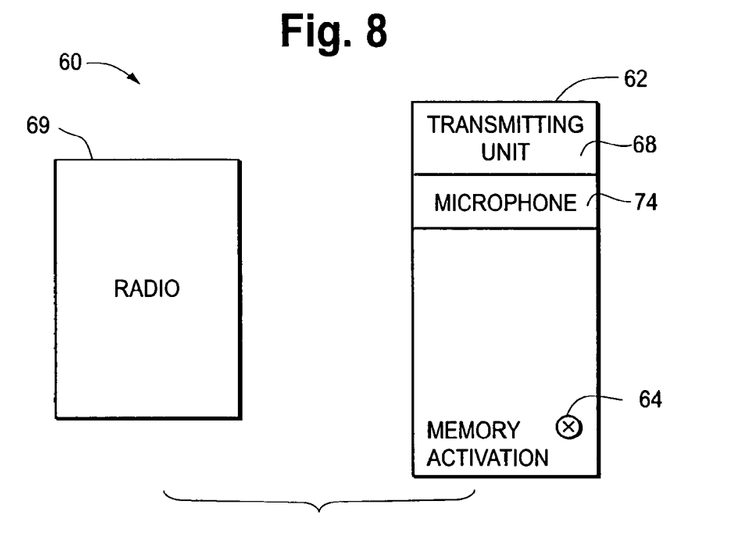
FIG. 8 illustrates an eighth exemplary embodiment of the systems and methods of the present invention.

In accordance with yet another alternate preferred exemplary embodiment, an aftermarket product such as the box described above further includes a transmitting element. This alternate embodiment is illustrated in FIG. 8 with reference to the system 60. The transmitting element 68 in the data storage unit 62 is activated when the user presses the single memory activation button 64 to select a desired song or otherwise designate desired information. By pressing the button 64, the user has designated the relevant time information based on the internal clock of the system. It should readily be apparent that this clock should be synchronized with an accurate clock so that the information may be correctly identified.

The transmitting element 68 in the unit 62 is utilized to transmit a low-power FM signal that is swept across the entire FM band. The transmitting element transmits one or more tone pulses at each frequency and the data storage unit 62 includes a microphone 74 and decoding circuitry that is not illustrated. The decoding circuitry is used to identify when the tone signals have been received via the microphone 74. Essentially, the radio receiver generates audible tones in response to the transmission of these tone signals by the transmitting element 68 and these audible tones are utilized to confirm the particular station to which the user's radio is currently tuned. The transmitting element 68 transmits a low-power FM signal that is received by the radio receiver 69 so that the radio receiver 69 is able to generate an audio signal which includes the tones.

When this occurs, the system can automatically identify the transmitting station and information relating to the time and transmitting station is thereafter stored for subsequent retrieval. In accordance with a preferred embodiment of such a device, the device is preferably programmed to only transmit the tones at a limited number of frequencies corresponding to the frequencies of transmission for a limited number of transmitting stations that the user typically selects.

Figure 9:
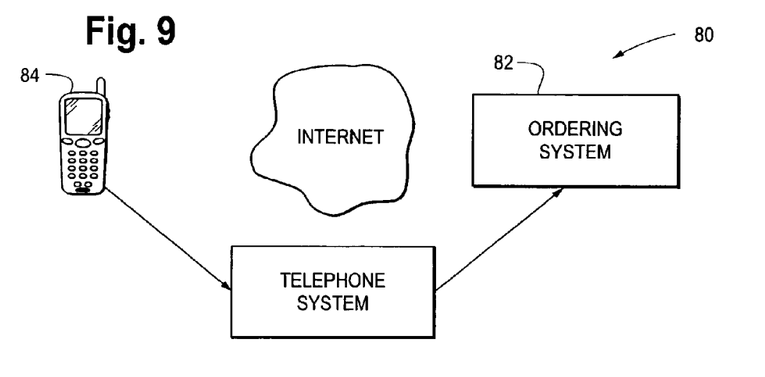
FIG. 9 illustrates a ninth exemplary embodiment of the systems and methods of the present invention.

In yet another preferred alternate exemplary embodiment, an automated telephone service is provided for automatically generating the desired artist and track information based on user entry of transmitting station information and information identifying the time of the desired transmission. This alternate preferred exemplary embodiment of the system is illustrated in FIG. 9 with reference to the system 80. In accordance with this alternate embodiment of the system, a user is able to access an ordering system 82 in real-time such as, with a cellular telephone 84 and the like.

The user is able to interact with an automated telephone system to purchase the desired song or songs in similar fashion to the previously described systems. Preferably, in accordance with the preferred exemplary embodiment of the present invention, a user sets up an account with the ordering system service provider. The ordering system 82 is preferably able to automatically identify the user such as, for example, through caller ID information associated with the telephone 84 which may be a cellular telephone or more conventional device. Alternatively, the cellular telephone may be a Web enabled device so that the device may access the ordering system 82 via the Internet.

In accordance with the preferred exemplary embodiment, a user who hears a particular song of interest need only call or otherwise contact the ordering system 82 so that the user may identify the current transmitting station. As a result, because this occurs in real-time, the ordering system 82 is able to determine the particular song or other information which the user desires to acquire. This is readily accomplished based on access to play list information in similar fashion to the correlation procedures described above. Preferably, the ordering system 82, maintains access to play list information from a variety of transmitting stations. This is preferably accomplished by providing Internet access to one or more web sites which maintain this information.

Access to this information may be accomplished in a variety of different ways. For example, the information may be compiled in a database and participating transmitting stations will transmit their play list information so that the system may acquire the data and update that a database. Alternatively, the ordering system 82 may use a computer to access the Internet and identify the desired information based upon the play list information stored at a participating transmitting stations web site. It should be readily apparent that the play list information could be accessed by the ordering system in a variety of different manners and the particular way in which the system accesses this information is not important. The ordering system 82 may actually utilized the Web interface technology described above for acquiring the correlation information.

The ordering system 82 allows the user to selectively purchase either an entire original artist disk or only selectively identified songs. The system then provides the user with a hard copy of a disc containing the desired information. Alternatively, the desired information is transmitted to a user device for storage and playback. In accordance with the preferred embodiment of this implementation, a user preferably set up an account with the ordering system 82. As a result, the user may be entitled to order a predetermined number of songs every month, for example.

In utilizing the system, when a user hears a particular song or other item of interest over a radio, for example the user contacts the ordering system with a cellular telephone 84 preferably through the conventional telephone system 85 or alternatively through the Internet. Preferably, the ordering system 82 is provided with an automated voice response system whereby the user is able to simply enter via the telephone keypad 87 the station of transmission information. The user is also preferably able to indicate whether the song or other desired data is currently playing or whether the desired data was transmitted at an earlier point in time. In alternate embodiment, where the cellular telephone 84 also includes a radio, the device may automatically transfer information sufficient to identify the transmitting station and time of transmission because the device itself will maintain the information internally in similar fashion to the devices described above. Similarly, the cellular telephone 84 may actually interface with another user device in order to access stored time of transmission and tuned station information so that a plurality of songs or other pieces of information may be automatically ordered.

It has now been further recognized that the systems and methods of present invention have broader applications beyond the music industry. For example, in yet another alternate preferred exemplary embodiment, users are able to designate news stories or sports information in similar fashion. Specifically, for example, users are able to simply push a button on an enabled radio, television or other aftermarket product and designate relevant time and transmitting station identification information. The information is then stored so that it may be subsequently utilized for the purpose of requesting the complete news story electronically to the user. This is accomplished in similar fashion to the ordering of music described above. Additionally, when the user requests news items, the system also preferably provides further links or the direct transmission of yet additional information that is relevant to the particular story. The recipient is then able to read all of the relevant information and/or forward this information to other individuals who may be interested in information.

For example, this alternate preferred exemplary embodiment of the present invention may be particularly useful for those who listen to news stations. When a particular story comes on the radio in which the user has a particular interest or is aware of other individuals who may be interested in the story, the user simply presses the button to record in the transmitting station and time information. The complete story and/or other pertinent information may then be subsequently downloaded from a web site that provides correlation between the designated transmitting station and transmission time information and the relevant text or other information. The user may also receive links so that additional relevant information can be accessed.

Figure 10:
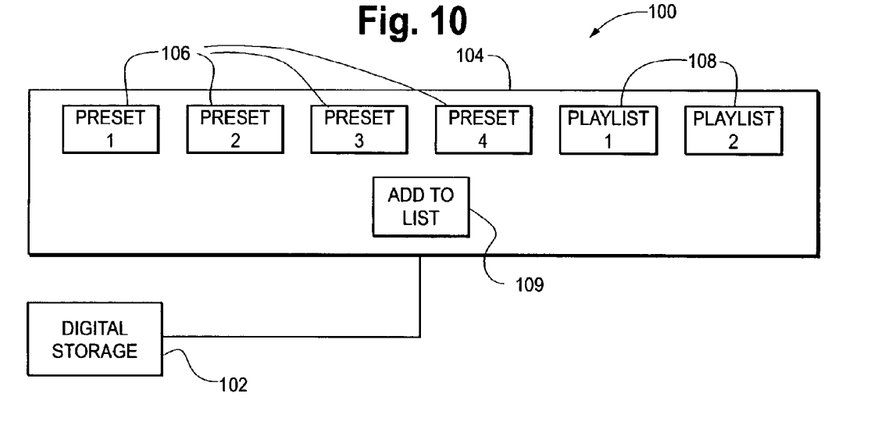
FIG. 10 illustrates a tenth exemplary embodiment of the systems and methods of the present invention.

FIG. 10 illustrates operation of the systems and methods of the present invention when utilized in conjunction with an overall music storage and management system which is shown generally at 100. In accordance with this embodiment of the present invention, a user's radio device also includes a corresponding storage mechanism such as a portable hard disk drive or other memory such as EEPROM or any other digital data storage 102. The hard disk drive or digital data storage 102 is preferably utilized for storage of the user's music files as well as play list information. Additionally, the device preferably also includes a radio and a transmission frequency or station and time of transmission storage designator such as the one described above. The desired data designating information (time of transmission and frequency or station of transmission) may be stored in the digital storage 102 or in a separate memory such as a memory 14 described above.

In accordance with this exemplary embodiment of the system, a user is able to choose between selecting a particular radio station as a source for music or the user is able to alternately listen to one of the music files stored on the system. When using the radio portion of the system, the user may designate a currently transmitted song as being of interest so that it may be purchased by the user in similar fashion to the system described above.

More specifically, the user radio 104 includes a plurality of preset transmission station selection buttons 106 which enable quick and convenient user selection of a desired radio station. Alternatively, the user is provided with the ability to select previously recorded songs for playback. The user may select a random selection or a song from a predefined play list. The exemplary embodiment illustrated in FIG. 10 includes two play list buttons 108. As known in the art, play lists may be directed to a specific type of music or artist, for example.

In utilizing the device illustrated in FIG. 10, a user is thus able to choose between listening to either a current transmission or prerecorded songs. The user selects a current transmission by choosing one of the plurality of radio stations that have been programmed into the preset selection buttons of the radio 104 as is known in the art. Alternatively, the user may manually tune the radio to a desired station. Additionally, the user may choose pre-recorded songs by selecting a play list for example the in the play list selection buttons 108.

When listening to a song from a radio station, the user may determine that the currently transmitted song should be added to the digital storage 102. In accordance with the preferred exemplary embodiment, the device includes a request or add to list designator 109. By pressing button 109, the user is able to designate the currently transmitted song as being of interest for subsequent purchase. In the preferred exemplary embodiment, the device then stores the current time and currently tuned station or tuner information so that the user may subsequently order a desired song or other data as described above. As noted above, it is preferred that the device accumulate a number of user purchase designations or requests so that a number of data items may be downloaded at a single time.

In the preferred exemplary embodiment, the actual device 104 or a memory associated with the device 104 (for example the digital storage memory 102 or an alternate memory such as the memory 14 described above) is interfaced either directly or via computer such as computer 22 described above directly or indirectly with a database or data structure which provides the requisite correlation between currently tuned information and time of transmission to a desired song or other item of interest so that the user may request a song for downloading or other ordering. In a fully automated system, a user will subscribe to a service that provides a certain number of songs for downloading every month, for example. The user is then able to automatically download desired songs into digital storage 102 simply by designating the songs by storing the time of transmission and tuner/station of transmission information. Thereafter, either the user device such as the radio 104 itself, or another processor controlled unit such as the computer 22 when interfaced with the memory or device 104 will automatically request and preferably handled transmission of the desired song into the digital storage 102. Alternatively, as described with respect to one of the alternate embodiments above, the user may be presented with the option of confirming a request for download based on presentation of a portion of a song or other information.

Accordingly, a user is able to automatically update songs stored in digital storage 102 simply based upon an instantaneous selection or request of the user. In alternate arrangements, the system will allow the user to preview a song in order to confirm the desired to purchase a particular song. In accordance with the preferred exemplary embodiment, at least the digital storage memory 102 is portable so that a user may connect this unit with a sound system of an automobile as well as a home audio system so that the user is able to access stored audio information and order additional information or music both at home and on the road. At the very least, this memory unit 102 or 14 of a portable device such as when embodied as a car stereo is preferably synchronized with a corresponding storage associated with a home audio system so that the user has access to all audio information at anytime. In the preferred exemplary embodiment, the synchronization process between the two devices also preferably includes the automatic or selective downloading of user designated songs for addition to the audio data maintained in digital storage 102. By managing play lists, the user is also able to add and delete items from these lists.

It has also been recognized that the systems and methods of the present invention have applications to the field of audio listening devices which are compatible with direct satellite broadcast transmission technology. One advantage to these systems is that they typically provide users with the ability to specifically identify a particular artist and song based on digitally transmitted identification information. However, it is not believed that these systems currently provide users with the ability to conveniently order a desired song. Accordingly, the storage techniques described herein may also be utilized in conjunction with a satellite broadcast system for the purpose of acquiring a list of desired songs for subsequent purchase.

More specifically, in a system that is compatible with satellite or other digital broadcast technology, an enhanced version of such a system includes the ability to automatically designate a particular song for storage and or downloading. This is accomplished in similar manner to the system described with reference to FIG. 10. However, in this alternate embodiment, the system at least directly stores and accumulates data which specifically identifies the desired information of interest such as, for example, the artist and title of the songs that a user wishes to purchase or otherwise download. In this embodiment it is thus not necessary to subsequently correlate the time of transmission and frequency or station of transmission information with the desired information of interest.

One further advantage of direct broadcast satellite systems is that they typically provide high quality digital transmission which would be suitable for direct storage into a storage device such as digital storage 102 referenced in FIG. 10. However, one of the problems with instantaneously designating a currently transmitted song for downloading is that the first portion of the song is typically missed because a user will have designated a song for storage only after part of the song as already been played.

Accordingly, it is preferred that the system include sufficient memory to dynamically store the preceding several minutes of user selected broadcast so that a user may be able to instantaneously select a song for storage and thereby be able to acquire the entire song without having to further request this audio information.

Regardless of the way in which the audio information is requested and stored on digital storage 102, the user is provided with the ability to designate one or more play lists to which any new song should be added. Accordingly, by using the systems and methods of the present invention, a user is able to easily choose between current radio transmissions or stored music such as those associated with play lists, for example, while also being provided with the ability to readily identify new songs for addition to the user's play lists. As noted above, the digital storage unit 102 may be the only storage member for the user's music or alternatively, the user may have a home digital storage and a portable digital storage which are synchronized so that the user is provided with convenient access to desired music at all times.

Figure 11:
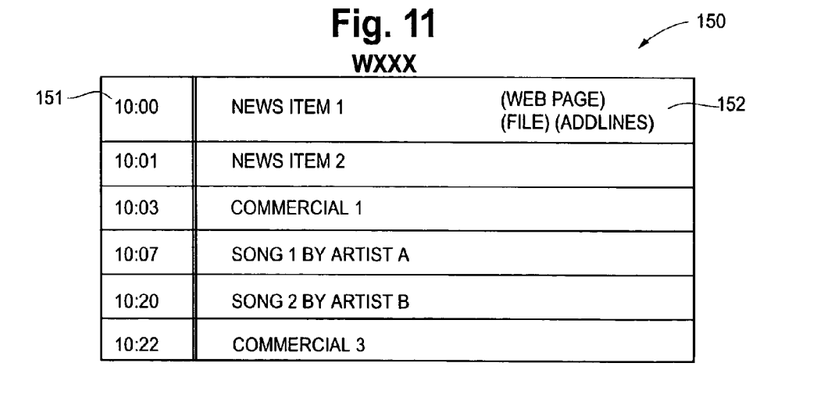
FIG. 11 illustrates an exemplary embodiment of the systems and methods of the present invention.

FIG. 11 is an illustrative example of the type of information that is stored in accordance with the systems and methods of the present invention. In this exemplary embodiment, time of transmission information is correlated with the specific data that is transmitted at the corresponding time. For example, news items, commercials, and songs 152 are each designated as falling within their corresponding time slot 151. The systems and methods of present invention use the designating information that is correlated by this data structure or database so that a user may either directly download or subsequently request the corresponding information. For example, the data structure 150 described in FIG. 11 may actually contain web pages or designations thereof, files or additional links or content which are particularly useful in reference to specific news items of interest. Commercials or products that are designated by a user are specifically identified by the data structure which may contain or provide links to electronic coupons or other product information.

Those skilled in the art will appreciate that any memory construct or data structure may be utilized for providing correlation between a particular station of transmission and time of transmission and the desired data. It should be apparent that the data may be arranged in a variety of different formats in order to provide the necessary correlation information. For example, the database or the stored data construct could be alternatively arranged for a plurality of different transmitting stations. The data associated with a particular time of transmission and contained in the database may actually be the data of interest such as a news item or an actual digital representation of the song or it may simply be a more specific designation which allows the user to subsequently access or otherwise download the data. For example, the data construct could be arranged to provide a link to a further site or web page that allows the user to specifically order or download the now identified information. More specifically, the desired data may actually reside in the database or data construct along with additional items of interest such as web pages, files or additional links. Alternatively, the data may simply more specifically and directly identify the information of interest so that the user may thereafter interact with a further web site for actually ordering and downloading the information.

In regard to the clocks described above in relation to the various embodiment of the system, it should be noted that the clocks may maintain actual time or relative time so that the system may simply interact with the clock in order to determine current time in relation to the system relative time so that the desired information may be identified.

The various embodiments which have been described above are exemplary only and should in no way be considered in any way limiting as to the scope of the present invention.

We claim:

1. A system for storing and reproducing digital music data and automatically transferring song identifying data comprising:

a portable battery powered electronic device that provides digital music storage and playback operations having an electronic memory and interface circuitry that establishes a temporary communication interface directly between a radio system and the portable battery powered electronic device, the interface circuitry transferring control signals generated by the radio system specifically for controlling the selective transfer of music data from the portable battery powered electronic device directly to the radio system via the temporary communication interface, the portable battery powered electronic device having circuitry that processes and responds to the control signals generated by the radio system, one or more of the control signals initiating transfer from the portable battery powered electronic device of one or more songs of digitally recorded music data directly to the radio system via the temporary communication interface for reproduction by the radio system; and wherein the portable battery powered electronic device has circuitry that automatically communicates directly with the radio system via the temporary communication interface for automatically transferring digital song identifying data from an electronic memory of the radio system to the portable battery powered electronic device for storage therein; and further wherein the portable battery powered electronic device automatically communicates with a user computer and provides the digital song identifying data to the user computer, and wherein the digital song identifying data is initially stored in the electronic memory of the radio system based on a user selection made via an interface of the radio system, the digital song identifying data is automatically transferred from the electronic memory of the radio system to the portable battery powered electronic device without user selection of the data for transfer and a computer program of the system for storing and reproducing digital music data located at the user computer automatically generates an electronic message which transfers the digital song identifying data to a remote server without user selection of the data at the user computer and a responsive electronic communication received at the user computer is processed to present the user with link data for preview and/or purchase of one or more songs corresponding to the digital song identifying data.

2. The system for storing and reproducing digital music data and automatically transferring song identifying data of claim 1, wherein the interface circuitry is a USB interface.

3. The system for storing and reproducing digital music data and automatically transferring song identifying data of claim 1, wherein the digital song identifying data is automatically transferred from the portable battery powered electronic device to the computer during a synchronization operation.

4. A method for storing and reproducing digital music data and automatically transferring song identifying data via a portable battery powered electronic device which provides digital music storage and playback operations comprising:
   establishing an electronic communication interface directly between the portable battery powered electronic device and a radio system, wherein the electronic communication interface transfers control signals generated at the radio system, from the radio system to the portable battery powered electronic device and transfers digital music data from the portable battery powered electronic device to the radio system based on the received control signals;
   automatically receiving and storing in an electronic memory of the portable battery powered electronic device, digital song identifying data that is automatically transferred from an electronic memory of the radio system via the electronic communication interface at a time when the electronic communication interface is established; and
   subsequently establishing an electronic communication interface between the portable battery powered electronic device and a user computer; and automatically transferring the digital song identifying data from the digital music storage and playback device to the user computer via the electronic communication interface with the user computer, and wherein the digital song identifying data is initially stored in the electronic memory of the radio system based on a user selection made via an interface of the radio system, the digital song identifying data is automatically transferred from the electronic memory of the radio system to the digital music storage and playback device without user selection of the data for transfer and a computer program of the user computer automatically generates an electronic message which transfers the digital song identifying data to a remote server without user selection of the data at the user computer and a responsive electronic communication received at the user computer is processed by the computer to present the user with link data for preview and/or purchase of one or more songs corresponding to the digital song identifying data.

5. The method for storing and reproducing digital music data and automatically transferring song identifying data of claim 4, wherein the communication interface circuitry is a USB interface.

6. The method for storing and reproducing digital music data and automatically transferring song identifying data of claim 4, wherein the song identifying data is automatically transferred from the portable battery powered electronic device to the computer during a synchronization operation.

7. A system for storing and reproducing digital music data and automatically transferring song identifying data via a portable battery powered electronic device which provides digital music storage and playback operations comprising:
   the portable battery powered electronic device having an electronic communication interface means providing an electronic communication interface directly between the portable battery powered electronic device and a radio system;
   the portable battery powered electronic device having a means for receiving control signals directly from the radio system in the portable batter powered electronic device via the electronic communication interface, wherein one or more of the control signals initiates the transfer of one or more songs of digitally recorded music data from the portable battery powered electronic device to the radio system for reproduction by the radio system;
   the portable battery powered electronic device having a means for automatically receiving and storing in an electronic memory of the portable battery powered electronic device, digital song identification information that is automatically transferred from an electronic memory of the radio system via the electronic communication interface means when the portable battery powered electronic device is interfaced directly with the radio system via the electronic communication interface means; and
   the electronic communication interface means providing an electronic communication interface between the portable battery powered electronic device and a personal computer for automatically transferring the digital song identification information from the portable battery powered electronic device to electronic memory in the personal computer, and wherein the digital song identification information is initially stored in the electronic memory of the radio system based on a user selection made via an interface of the radio system, the digital song identification information is automatically transferred from the electronic memory of the radio system to the portable battery powered electronic device without user selection of the data for transfer and a computer program of the user computer automatically generates an electronic message which transfers the digital song identification information to a remote server without user selection of the data at the user computer and a responsive electronic communication received at the user computer is processed via the computer to present the user with link data for preview and/or purchase of one or more songs corresponding to the digital song identification information.

8. The system for storing and reproducing digital music data and automatically transferring the digital song identification information of claim 7, wherein the interface circuitry is a USB interface.

9. The system for storing and reproducing digital music data and automatically transferring digital song identification information of claim 7, wherein the digital song identification information is automatically transferred from the portable battery powered electronic device to the computer during a synchronization operation.

10. The method for storing and reproducing digital music data and automatically transferring song identifying data of claim 4, further comprising purchasing at least one song using the link data.

11. An automobile sound system comprising:
  tuner circuitry and a user interface presenting a plurality of user selections, one or more of the user selections in the user interface, when selected, generating at least one control signal causing the tuner circuitry to select a predetermined frequency for demodulation and reproduction via the automobile sound system;
  an electronic communication interface providing a temporary electronic communication interface directly between the automobile sound system and a portable battery powered electronic device which provides digital music storage and playback operations;
  wherein the user interface for the automobile sound system presents a plurality of user selections specifically designated for controlling interaction with the portable battery powered electronic device and which, when selected, cause generation of one or more control signals based on a user selection at the automobile sound system user interface that are transferred directly to the portable battery powered electronic device via the temporary electronic communication interface, the one or more control signals causing transfer of one or more digitally recorded songs from the portable battery powered electronic device directly into the automobile sound system via the temporary electronic communication interface for reproduction by the automobile sound system;
  wherein the automobile sound system user interface also includes user selection circuitry for generating a storage instruction signal based on a user input selection, the user input selection indicating a user intention to subsequently transfer a currently reproduced song into the portable battery powered electronic device, the storage instruction signal causing the automobile sound system to store in an electronic memory of the automobile sound system digital information sufficient to identify the currently reproduced song, and the automobile sound system stores digital information sufficient to identify a plurality of songs in the electronic memory of the automobile sound system based on user input selections at a time when the portable battery powered electronic device is not connected to the automobile sound system; and
  further wherein the automobile sound system automatically communicates with the portable battery powered electronic device to provide the automatic transfer of the digital information sufficient to identify a plurality of songs from the automobile sound system electronic memory to a memory of the portable battery powered electronic device when the portable battery powered electronic device is temporarily connected to the automobile sound system via the electronic communication interface, and further wherein the automatic transfer of the digital information sufficient to identify a plurality of songs occurs without user selection of the digital information to be transferred from the automobile sound system electronic memory to the memory of the portable battery powered electronic device; and
  wherein the automobile sound system effects communication with a user computer based on the automated transfer of the digital information sufficient to identify a plurality of songs into the memory of the portable battery powered electronic device, the communication occurring via the portable battery powered electronic device at a time when the portable battery powered electronic device is connected to the user computer based on the original automatic transfer of the digital information sufficient to identify a plurality of songs into the portable battery powered electronic device thereby providing the digital information sufficient to identify a plurality of songs to the user computer, a computer program executed at the user computer causing automatic generation of an electronic communication from the computer to a remote server, the electronic communication transferring digital information sufficient to identify the plurality of songs stored in the memory of the portable battery powered electronic device without selection of the digital information by the user and the computer program of the user computer processing a responsive communication in order to provide the user with a plurality of link data providing for the purchase and/or preview of the plurality of songs originally designated by the user selection circuitry of the automobile sound system.

* * * * *